US010857467B2

(12) United States Patent
Magpuri et al.

(10) Patent No.: US 10,857,467 B2
(45) Date of Patent: Dec. 8, 2020

(54) NETWORK GAMING RIDE ATTRACTION

(71) Applicant: Falcon's Treehouse LLC, Orlando, FL (US)

(72) Inventors: Cecil D. Magpuri, Orlando, FL (US); Michael John Wallace, Orlando, FL (US); David Michael Schaefer, Orlando, FL (US); Syed Saham Ali, Orlando, FL (US); David James Consolo, Orlando, FL (US)

(73) Assignee: FALCON'S TREEHOUSE LLC, Orlando, FL (US)

( * ) Notice: Subject to any disclaimer, the term of this patent is extended or adjusted under 35 U.S.C. 154(b) by 0 days.

(21) Appl. No.: 16/514,679

(22) Filed: Jul. 17, 2019

(65) Prior Publication Data

US 2019/0336864 A1 Nov. 7, 2019

Related U.S. Application Data

(63) Continuation of application No. PCT/US2019/019775, filed on Feb. 27, 2019, which
(Continued)

(51) Int. Cl.
*A63F 13/69* (2014.01)
*A63F 13/46* (2014.01)
*A63G 31/16* (2006.01)

(52) U.S. Cl.
CPC .............. *A63F 13/69* (2014.09); *A63F 13/46* (2014.09); *A63F 2300/407* (2013.01); *A63F 2300/5546* (2013.01); *A63F 2300/609* (2013.01)

(58) Field of Classification Search
CPC .......... A63G 31/00; A63G 31/16; A63G 7/00; A63J 5/00; A63J 5/021; A63F 13/46; A63F 13/69
(Continued)

(56) References Cited

U.S. PATENT DOCUMENTS 6,179,619 B1   1/2001 Tanaka
6,224,491 B1 * 5/2001 Hiromi ................ A63G 31/007
                                              472/59
(Continued)

FOREIGN PATENT DOCUMENTS

CN    202715234 U   2/2013
KR    20170102758 A  9/2017

OTHER PUBLICATIONS

International Search Report and Written Opinion for International Application No. PCT/US2019/019775; dated Jun. 13, 2019; 12 pages.

*Primary Examiner* — Kien T Nguyen
(74) *Attorney, Agent, or Firm* — Perkins Coie LLP; Kenneth H. Ohriner

(57) ABSTRACT

A method for operating an entertainment attraction includes receiving an input selection from a guest relating to a characteristic of the attraction. The guest creates their guest profile, or by accesses their previously created profile stored in a memory. The profile may be changed by the current input selection made by the guest, with the changed profile stored for the guest's next use of the attraction. If the attraction is a ride, the guest is assigned to a viewing position, an active prop, a seat, or a vehicle of the attraction. The attraction is then operated with the input selection and/or the guest's profile influencing a characteristic of the attraction as perceived by the guest. A mobile application gameplay may unlock specified game features to change the attraction experience. The attraction may alternatively be a theater or game arcade type of attraction.

9 Claims, 4 Drawing Sheets

Related U.S. Application Data is a continuation-in-part of application No. 15/910,915, filed on Mar. 2, 2018, now abandoned.

(60) Provisional application No. 62/760,809, filed on Nov. 13, 2018.

(58) Field of Classification Search
USPC .......... 472/43, 59–61, 130; 434/55; 463/1, 5
See application file for complete search history.

(56) References Cited

U.S. PATENT DOCUMENTS

| | | |
|---|---|---|
| 6,386,984 B1 * | 5/2002 | Hara ...................... A63G 31/16 434/55 |
| 8,831,840 B2 | 9/2014 | Klappert et al. |
| 9,540,832 B2 | 1/2017 | Magpuri |
| 2006/0293110 A1 | 12/2006 | Mendelsohn |
| 2013/0244801 A1 | 9/2013 | Frolov |
| 2015/0190726 A1 | 7/2015 | Frolov |
| 2016/0089610 A1 | 3/2016 | Boyle et al. |
| 2016/0346704 A1 | 12/2016 | Wagner |

* cited by examiner

NETWORK GAMING RIDE ATTRACTION

CROSS REFERENCE TO RELATED APPLICATION(S)

This application is a continuation of International Application No. PCT/US2019/019775 filed Feb. 27, 2019 and now pending. This application is also a continuation-in-part of U.S. patent application Ser. No. 15/910,915, filed Mar. 2, 2018, now pending. This application claims the benefit of and priority to U.S. Provisional Application No. 62/760,809, filed Nov. 13, 2018. Each application listed above is incorporated herein by reference.

TECHNICAL FIELD

The field of the application is rides, theater presentations and themed and game attractions as often provided in theme or amusement parks or game arcade-type locations.

BACKGROUND OF THE INVENTION

Various theme park rides, shows, game locations and other attractions, collectively referred to here as attractions, have been created to provide guests with unique experiences. In ride attractions, guests typically sit in a vehicle that travels along a fixed indoor or outdoor path or track. In theater-type attractions, guests watch moving images on a screen, with or without live actors and/or special effects. Various walk-through attractions with thematic show elements and/or moving props and live actors, have also been widely used. Arcade-type attractions typically have large numbers of individual video games, pinball machines, dance games, shooting games, etc. In these types of conventional attractions, the guest experience is largely fixed. The guest generally sees, hears and feels the same thing with each visit to the attraction. The guest also is also necessarily a passive observer or player and has no input into any aspect of the attraction. These factors may tend to reduce the excitement or enjoyment of the attraction over time.

As one example, rides have been built with multi-passenger vehicles that travel along a fixed path and allow guest to shoot at real targets in the physical environment or at virtual targets in a virtual reality space. Independently, mobile gaming has evolved to allow players to create virtual characters and upgrade them through accomplishments, in-games purchases, or other rewards, providing an ever-changing gaming environment. Combining gaming features with a ride allows guests to compete in games of skill, with added excitement created by the movement of the vehicle, or of a motion base supporting seating on the vehicle. Although a repeat rider may be familiar with the general path of the ride, the gaming aspect may create interest during second and subsequent rides.

However, regardless of such enhancements to these passenger vehicle rides, repeat riders may over time feel the ride experience is no longer interesting or exciting. Accordingly, there is a need for an improved attractions and systems that can offer new effects and enhanced experiences.

SUMMARY OF THE INVENTION

In one aspect, a method for operating an attraction includes receiving an input selection from a guest relating to a characteristic of the attraction. The guest is assigned a viewing position, an active prop, a seat or a vehicle of the attraction. The attraction is then operated with the input selection influencing the characteristic of the attraction as perceived by the guest. Generally, this may be performed by accessing a previously created profile of the guest stored in a memory. The profile may be changed by the current input selection made by the guest, with the changed profile stored for the guest's subsequent visit to, or participation in, the attraction. Guests may make their input selections using an app on their mobile phone. Alternatively, guests may use an input device, such as a kiosk, at the attraction venue.

In another aspect of the invention, a guest is assigned to a vehicle that moves in the attraction and the characteristic of the attraction changed by the guest's input selection is at least one of a path of the vehicle, a motion profile of the vehicle, a special effect created proximate to the vehicle, on-screen visual content, and/or a scoring characteristic of a game element used by the guest. The motion profile of the vehicle may include the velocity and acceleration or braking of the vehicle at selected locations along the path, and/or movements of a motion base (such as pitch, roll, yaw) on the vehicle supporting the seats in the vehicle.

In a separate aspect, an overlay control system for an attraction includes a first communication link between attraction elements and a controller, and a second communication link between the controller and a guest's smart phone or a queue kiosk used by the guest. The controller is adapted to modify at least one characteristic of the attraction based on an input selection made by the guest.

A networked gaming ride system combines elements of electronic gaming with elements of a theme park ride, to provide both custom gaming and custom rider experiences. The present networked gaming ride attraction uses a unique set of steps to connect a mobile gaming platform with a ride experience, allowing the gaming and ride aspects to influence each other. As riders visit the ride attraction, their mobile gaming experience may be improved via enhanced gaming features, points, or power. And conversely, as mobile gamers play the game, their on-ride experience can be improved with additional features, points, or power. The combination of these gaming and ride elements creates an ever-changing ride and gaming platform.

BRIEF DESCRIPTION OF THE DRAWINGS

These and other features, aspects, and advantages of the present disclosure will become better understood when the following detailed description is read with reference to the accompanying drawings wherein the same element number indicates the same element in each of the views.

DETAILED DESCRIPTION

Figure 1:
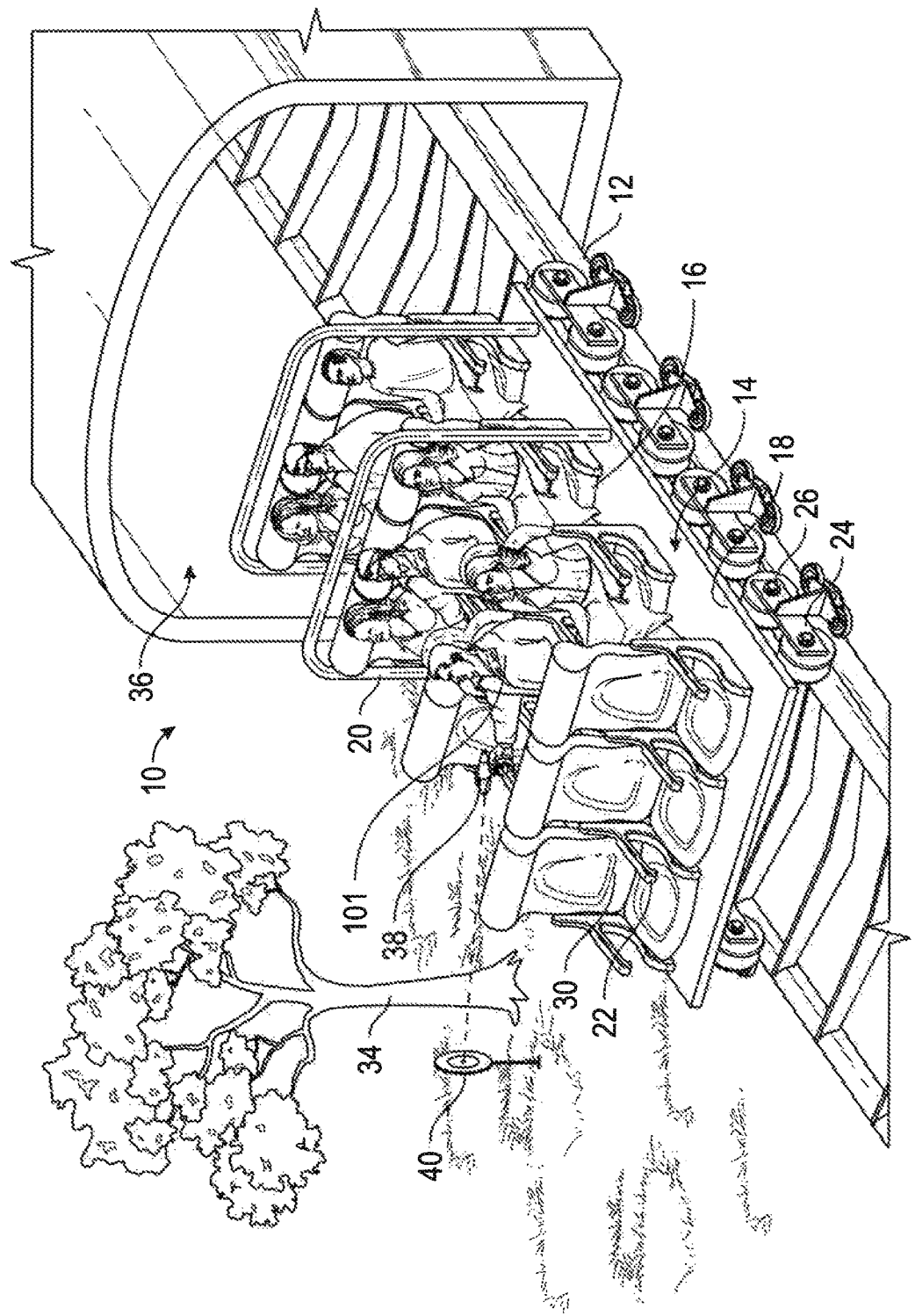
FIG. 1 is a perspective view of a ride attraction.

As shown in FIG. 1, a ride attraction 10 has a path or track 12, with vehicles 14 movable along the track 12. Seats 16 of the vehicle are attached to a floor or seating platform 18 which optionally is supported on a motion base 26, such as a flight simulator type of motion base 26. The motion base 26 is attached to a chassis 24 typically having wheels which roll on a path or track 12, although the vehicle may optionally be suspended from an overhead track, float on water, or use other support techniques such as magnetic-levitation, hover, etc. In some designs the vehicle may be designed to carry standing riders. The path or track 12 may be indoors to provide a dark ride, or be outdoors to provide a coaster type of ride, or include elements of both. Stationary, moving or animatronic figures, scenery and creative elements 34, may be provided along the path or track 12. The path or track 12 may also pass through un-themed space 36.

The riders or guests 101 may be provided with objects or props 38, such as magical wands, canes, gloves, etc., or fictional weapons such as ray guns, so-called phasors or similar objects, generally matching a specific storyline, such as a storyline from a movie, comic book, novel, etc. These objects 38 may be active in the sense that the ride system can detect whether a rider using the object has acquired or hit an intended target 40. The intended target may be a real fixed or moving robotic target, or a projected or virtual character or inanimate target. The objects 38 may also provide sound, vibration and/or visual effects when activated by a rider.

Figure 2:
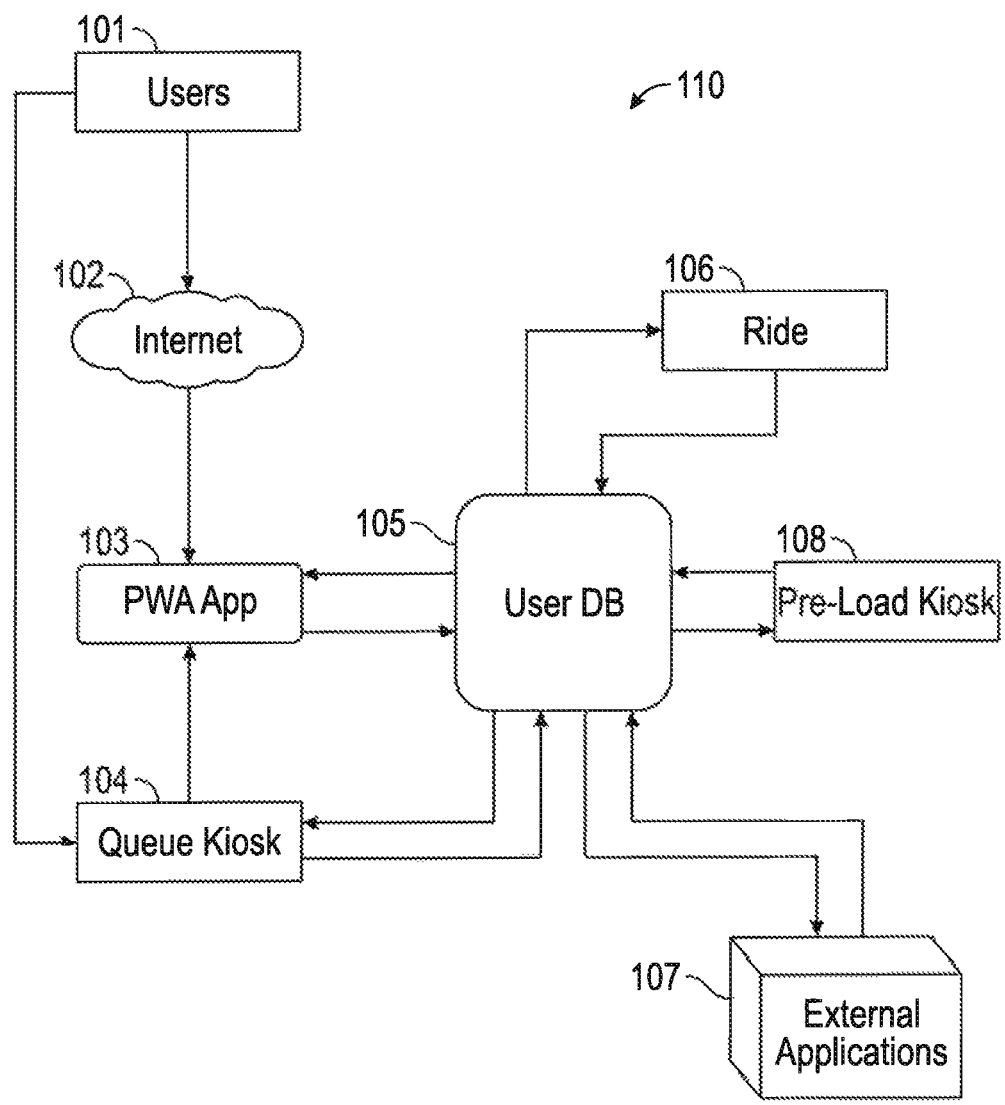
FIG. 2 is a diagram illustrating operation of a network gaming ride attraction.

Turning to FIG. 2, in operation riders 101 access the ride system 110 either through their smart phones (i. e, via the internet 102) or from a queue kiosk 104 while the riders are in the ride queue. From here riders have access to a rider or guest database 105 to create and modify their in-game character. Riders then board a ride vehicle 14, for example in the ride 106 shown in FIG. 1. The ride 106 may have themed elements such as scenery 34 and targets 34 matching those of a mobile game played on a smart phone. Once on the ride vehicle 14, the ride system pulls information from the database 105 and returns results back to the same database 105. After a rider completes the ride, the system records that the rider completed ride (i.e., adding to the rider's ride count) and also records the rider's score in the database 105. The system may then unlock features in the mobile game or other in-park rewards (such as a front-of-the-line pass, merchandise discounts, etc.). External applications 107, such as additional mobile bases, can alternatively be used to access guest data from the database 105 and return information as riders increase their scores, or abilities. A pre-load kiosk 108 may be used to assign each rider to a specific seat or position in a specific ride vehicle 14. Seat assignment may optionally be performed without a pre-load kiosk, for example with the ride system 110 providing each rider with an electronic boarding pass, or in other ways.

Each individual rider's on-ride experience may be enhanced via software. Typically the enhanced features vary depending on the storyline and installation site. For example, riders reaching a higher level of a game, or riders earning a higher score may be provided with a more powerful magic wand or weapon. Ride effects may also be changed, such as lighting effects (strobes, lasers, etc.) appearing when a rider obtains a specified point score. Similarly, other enhancements may include special effects such as fog, wind, water spray, etc. or onscreen animation and/or character actions and dialog.

The ride path, special effects, onscreen graphics, etc. may be customized or specifically made for each specific rider. This may be achieved via the riders wearing a virtual reality headset or googles. Alternatively, some of the enhancements can be more group or vehicle based (special effects for example) with others made more personal such as a result from hitting a target. A vehicle may include various quantity of riders with different character attributes, so their powers appear differently, to help distinguish each rider's gameplay from adjacent riders in the same vehicle. For example, each rider's object 38 may emit light of a specific color or character.

As used here, smart phone includes equivalent devices such as laptops, tablets, phablets, etc. Path means a physical path, such as a track, as well as a virtual path, such as an instruction set saved in a memory.

Figure 3:
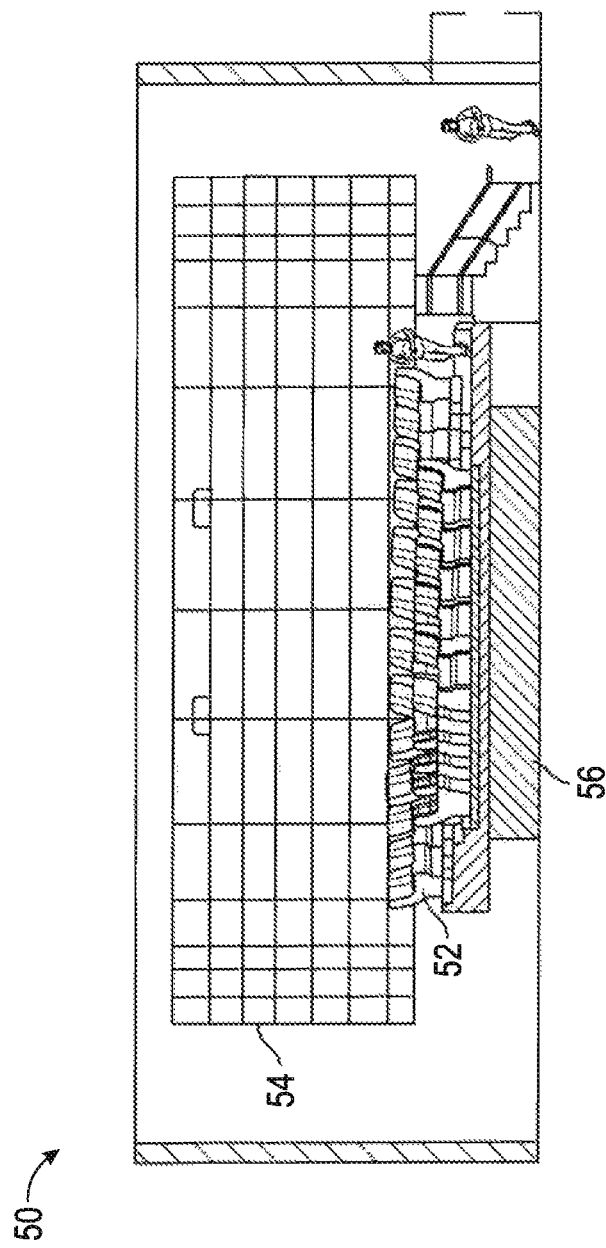
FIG. 3 is side view of a theater-type attraction.

FIG. 3 is a side view of a theater-type attraction 50 which typically has moving images displayed in front of a forward-facing audience, or in the example shown, with the audience on seating 52 facing radially inwardly or outwardly towards a surrounding screen 54. The theater type attraction 50 may be designed for example as described in U.S. Pat. No. 9,540,832. The seating 52 may be supported on a motion base or turntable 56. The principles of the invention apply to these and other types of attractions as well, including walk through attractions, attractions using virtual reality or augmented reality, tour-type attractions, and attractions having live actors.

Regardless of the specific type of attraction, before entering or boarding the actual attraction, guests may queue up in a free-roam queue or pre-show area 106 (or series of rooms) where guests are able to wait for their allotted attraction time, explore a themed environment thematically tied to the attraction narrative, and/or also learn how to create and change their profile to vary the attraction experience. Interactive terminals and mini-games that feature the same interactive methods used in the attraction may be provided in the queue or pre-show areas, which may alternatively be outdoors.

Figure 4:
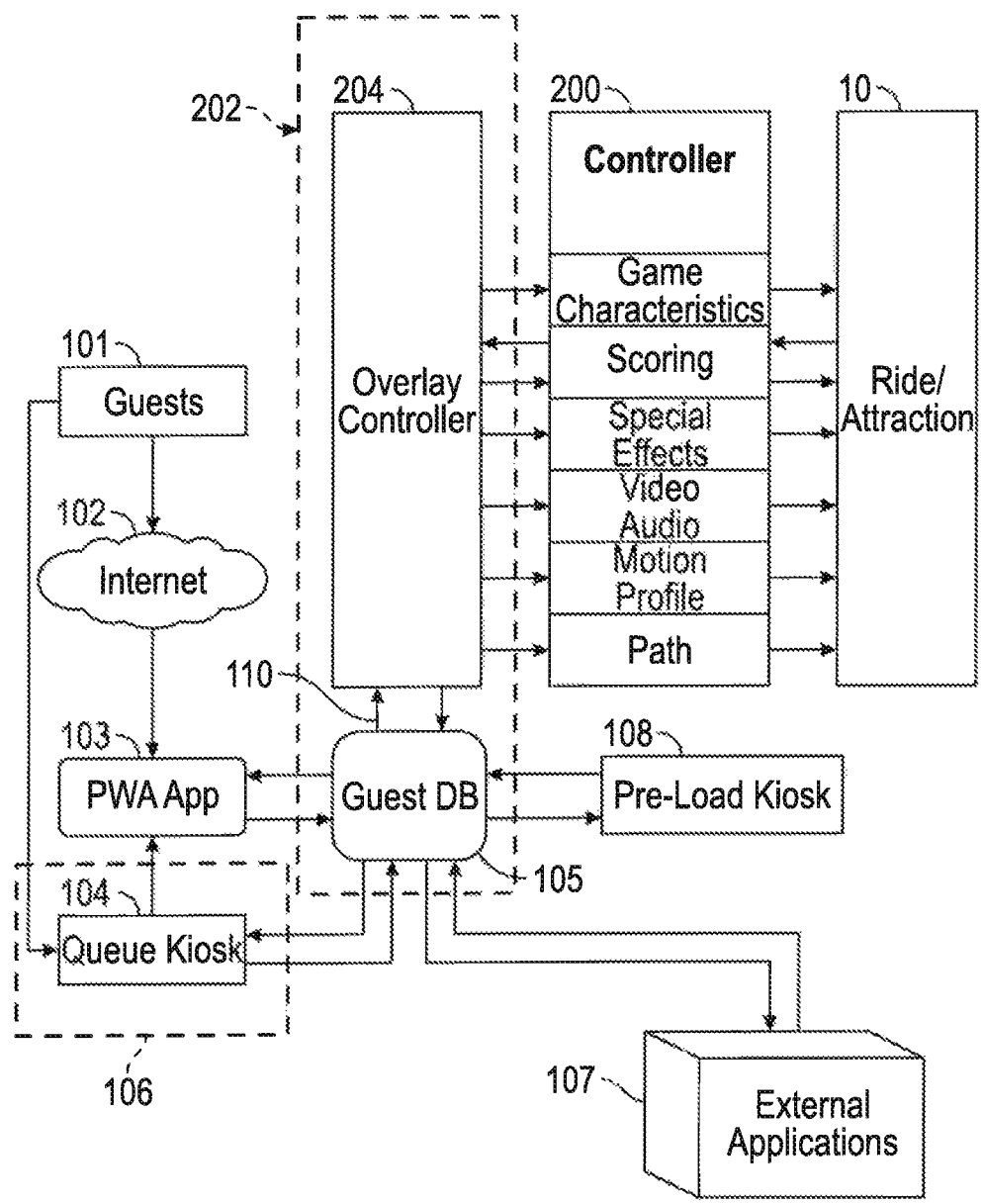
FIG. 4 is a diagram illustrating operation of an attraction overlay control system.

In the attraction overlay system of FIG. 4, guests or riders 101 access the system 202 either through their smart phones (i. e, via the internet 102) or from a queue kiosk 104 by checking in or logging in using a personal identifier, e.g., password, fingerprint, voice print, retina scan, smart phone proximity, etc. The guests may check in while in the attraction queue area 106, or elsewhere remote from the attraction. Upon checking in the overlay system 202 retrieves the guests profile from memory in the database 105. The guest's profile contains information about the guest's preferences, and optionally past attraction experiences. The overlay system 202 then loads the guest's profile into the attraction controller 200, or into a separate overlay controller 204, if used, so that the guest's upcoming attraction experience is modified to better fit the guest's profile. The modifications may involve selecting the guest's role or character in the attraction, varying the speed and intensity of the attraction, selecting the type and timing of visual and sound effects, or changing the ease or difficulty of gaming elements and game mechanics.

In creating or altering their profile, guests may select custom characters (or avatars) for themselves to enrich their attraction or game experiences. This may also involve allowing the guest to unlock new tools, abilities, aesthetics, and lore to use and enjoy on repeat experiences. Additionally, the rewards and outcomes of each attraction experience for each guest may be added to the guest's profile.

After checking in, the guest enters the attraction, or in the example of FIG. 1, boards a ride vehicle 14. Characteristics of the attraction are modified based on the guest's profile. The park operator may use an external applications module 107 to monitor or change guest profiles stored in the database 105, to provide messaging with guests, and for other functions. A pre-load kiosk 108 may be used to assign each guest to a specific seat or position in an attraction or a specific ride vehicle 14. Seat assignment may optionally be performed without a pre-load kiosk, for example with the overlay control system 202 providing each guest with an electronic boarding pass, or in other ways.

Referring still to FIG. 4, an existing conventional ride or attraction 10 is controlled by the attraction controller 200. The attraction controller 200 is typically pre-programmed with parameters that control various aspects of the attraction 10, which may include game characteristics, scoring, special effects, video/audio, motion base motion profiles, vehicle paths and movement profiles. The attraction controller may also handle other functions such monitoring sensors, performing load/unload functions, lighting, environmental elements, etc. The overlay system 202 may be retrofitted onto the controller 200, or provided as an integral component of a purpose-built attraction. In many applications the overlay system 202 may be provided as a software supplement to the controller 200. In this case no additional hardware may be needed, other than input devices, if used, such as the PWA App 103, the queue kiosk 104, the pre-load kiosk 108, and the external applications module 107. In other applications, the overlay system 202 may be provided as a separate controller 204 as shown in FIG. 4, which interfaces with the computer controller 200, or directly with the attraction 10.

In FIG. 4 the guest database 105 is shown as a separate element (such as cloud storage) connected to the overlay controller 204 via communication links 110. Optionally, the guest database 105 may be included in the overlay controller 204.

At pre-determined points during the ride, the guest's performance or score can change operation of the attraction, influencing elements such as scene selection, varying a storyline, and/or changing a vehicle ride-profile or motion base movements. The overlay system 202 may also allow guests to change the attraction operation based on collective decisions with other guests that are made via voting or the outcome of their collective performance in a particular scene or throughout the entire attraction. Use of the overlay 202 may promote a sense of community in which large groups of people are empowered to collaborate and/or compete as a team.

The ride path or attraction movements, special effects, onscreen graphics, etc. may be customized or specifically made for each specific guest. This may be achieved via the guests wearing a virtual reality headset or googles. Alternatively, some of the enhancements can be more group or vehicle based (special effects for example) with others made more personal such as a result from hitting a target. A vehicle may include various quantity of guests with different character attributes, so their powers appear differently, to help distinguish each guest's gameplay from adjacent guests in the same vehicle.

After completing the attraction experience, guests can use terminals or their own mobile devices to explore and interact with the outcome of their experience. A guest's gaming statistics, customizations, awards, credits, rewards etc. may be fed back into the cloud or local webserver/DB guest profile allowing guests to access their accounts from any internet connected device.

The overlay system 202 encourages repeated guest engagement. The overlay system 202 may also provide guests with a method for comparing their own performance or results in the attraction to the performance or results of other guests in the same attraction event, a different attraction event at the same venue, or a different attraction event at a different geographic location.

With the overlay 202 storing and tracking the guest's profile and venue activities, the overlay 202 causes the guest's profile to evolve in real-time with each accumulated visit to the attraction and/or access of the guest's profile on line. The successes, choices, and rewards that a guest earns are maintained in the guest's profile. This can allow the guest to feel a tangible sense of ownership in the attraction experience. Moreover, with the overlay system 202 storing and updating the guest's profile each time the guest rides or views the attraction, the profile data may allow the guest to earn physical rewards from in and around the attraction, including real or virtual prizes, discounts, promotional deals, VIP attraction passes, and special retail souvenirs.

For attractions involving scoring, high-score leaderboards in the park may visibly showcase guest's scoring. High-Scores may be awarded to individual guest avatars or collectively grouped factions from a storyline. The cumulative progress of a guest's individual avatar or of each global faction may then also be reviewed before and/or after visiting the attraction via an internet browser or mobile device. Guest refers to a person riding, using or experiencing the attraction. Rider refers to a guest using or experiencing a ride-type of attraction.

The methods described above may also be used at entertainment locations, such as game arcades having video games, such as shooting games, boxing, combat and fighting games, driving games, dance games, sports games, construction games, etc. In these cases, the attraction 10 in FIG. 4 is a game at an entertainment location. A game or app on the guest's smart phone (in the external applications 107 in FIG. 4) connects to the overlay controller 204 via a wifi or cellular link, to allow exchange of data. Alternatively, the guest may check-in with a specific individual game via a wireless radio or optical link, such as wifi or near-field communication. The attraction may also be a museum exhibit or similar display, with the exhibit modified based on the guest's character profile.

In one embodiment, a ride attraction includes a vehicle movable along a pathway. A first communication link is provided between the vehicle and a computer controller. A second communication link is provided between the computer controller and a rider's smart phone or a queue kiosk used by the rider. The computer controller is adapted to modify at least one of the pathway, a motion profile of a motion base, special effects in the ride attraction, onscreen graphics displayed in the ride attraction, and point scoring based on the rider's character profile created at least in part by the rider. The computer controller may have a memory storing a character profile of the rider. The first communication link may provide information about a rider's actions during the ride from the ride vehicle to the computer controller, and optionally provide instructions to the vehicle based on the rider's character profile and/or the rider's action during the ride, with the instructions influencing at least one of the pathway, special effects, onscreen graphics and scoring. The second communication link may provide information about the rider's character profile from rider's smart phone or a queue kiosk to the computer controller, and/or provide assigned vehicle and/or seat information from the computer controller to the rider.

Thus, novel systems and methods have been shown and described. Various changes and substitutions may of course be made without departing from the spirit and scope of the invention. The invention, therefore, should not be limited, except by the following claims, and their equivalents.

The invention claimed is:

1. A method for operating an attraction having an attraction controller for controlling attraction elements, comprising:

providing: an overlay controller; a first communication link between the overlay controller and the attraction controller and the attraction elements; and a second communication link between the overlay controller and a guest's smart phone or a queue kiosk used by the guest;

receiving an input selection in the overlay controller from the guest relating to a characteristic of an element of the attraction, the input selection received from the guest's smart phone or the queue kiosk;

the overlay controller adapted to change at least one characteristic of one or more of the attraction elements based on the input selection made by the guest; and subsequently operating the attraction with the input selection determining a characteristic of one or more of the elements of the attraction as perceived by the guest.

2. The method of claim 1 further including storing a profile of the guest in a memory in the overlay controller, the profile including the guest's preferences.

3. The method of claim 2 further including loading the profile of the guest from the overlay controller into the attraction controller, with the attraction controller then selecting a characteristic of an attraction element based on the profile of the guest.

4. The method of claim 3 further comprising changing the profile of guest after the guest's attraction experience is completed, based on actions of the guest during the attraction experience, and storing the changed profile in the memory of the overlay controller.

5. The method of claim 3 further including assigning the guest to a viewing position, seat or vehicle of the attraction based on the profile of the guest.

6. The method of claim 3 further including moving the guest on a vehicle in the attraction, wherein one of the attraction elements is a path of a vehicle, a motion profile of the vehicle, a special effect created proximate to the vehicle, and/or a scoring characteristic.

7. The method of claim 3 wherein one of the attraction elements includes a visual effect, a sound effect or a game scoring element.

8. The method of claim 3 further including providing information on the guest's progress at the attraction to the guest's smart phone via the internet, after the guest's attraction experience is completed.

9. The method of claim 1 wherein the overlay controller and the attraction controller are at fixed locations at the attraction.

* * * * *